United States Patent
Eager

(10) Patent No.: US 9,488,089 B2
(45) Date of Patent: Nov. 8, 2016

(54) METHOD OF CONTROLLING OPERATION OF AN ENGINE HAVING BOTH AN EXHAUST FLUID RECIRCULATION APPARATUS AND AN EXHAUST FLUID TREATMENT APPARATUS

(71) Applicant: Perkins Engines Company Limited, Peterborough, Cambridgeshire (GB)

(72) Inventor: Antony Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 14/416,239

(22) PCT Filed: Jul. 24, 2013

(86) PCT No.: PCT/GB2013/051978
§ 371 (c)(1),
(2) Date: Jan. 21, 2015

(87) PCT Pub. No.: WO2014/016595
PCT Pub. Date: Jan. 30, 2014

(65) Prior Publication Data
US 2015/0204227 A1    Jul. 23, 2015

(30) Foreign Application Priority Data

Jul. 27, 2012    (GB) .................................. 1213462.3

(51) Int. Cl.
*F02M 25/06*    (2016.01)
*F01N 3/00*    (2006.01)
(Continued)

(52) U.S. Cl.
CPC ............... *F01N 3/36* (2013.01); *F01N 3/0253* (2013.01); *F01N 9/00* (2013.01); *F01N 11/00* (2013.01);
(Continued)

(58) Field of Classification Search
CPC ............... F01N 11/00; F01N 2610/03; F01N 2610/146; F01N 2610/1453; F02D 41/0077; F02D 41/025; F02D 41/029; F02D 41/405; F02M 25/0717; Y02T 10/26; Y02T 10/44; Y02T 10/47
USPC .................................. 60/278, 285, 286, 303
See application file for complete search history.

(56) References Cited

U.S. PATENT DOCUMENTS

| 5,724,808 A | 3/1998 | Ito et al. |
| 6,594,990 B2 | 7/2003 | Kuenstler et al. |

(Continued)

FOREIGN PATENT DOCUMENTS

| EP | 0974747 A2 | 1/2000 |
| EP | 1382812 A1 | 1/2004 |

(Continued)

OTHER PUBLICATIONS

European Patent Office, International Search Report in International Patent Application No. PCT/GB2013/051978, Jul. 11, 2013, 3 pp.
(Continued)

*Primary Examiner* — Thomas Denion
*Assistant Examiner* — Diem Tran

(57) ABSTRACT

In an engine unit including a combustion unit and an exhaust fluid recirculation apparatus where unburnt fuel is provided to an exhaust flow treatment apparatus for combustion, it may be desirable to prevent unburnt fuel from entering the exhaust fluid recirculation apparatus. A method of controlling operation of an engine unit includes confirming that a valve of the exhaust flow recirculation apparatus is closed, and overriding a control signal for controlling the valve in order to ensure that the valve remains closed before injecting fuel upstream of the valve for combustion in the exhaust fluid treatment apparatus.

15 Claims, 5 Drawing Sheets

(51) Int. Cl.
F01N 3/10 (2006.01)
F01N 3/36 (2006.01)
F02D 41/00 (2006.01)
F02D 41/02 (2006.01)
F02D 41/40 (2006.01)
F01N 3/025 (2006.01)
F01N 9/00 (2006.01)
F01N 11/00 (2006.01)

(52) U.S. Cl.
CPC ......... F02D 41/005 (2013.01); F02D 41/0047 (2013.01); F02D 41/0077 (2013.01); F02D 41/025 (2013.01); F02D 41/029 (2013.01); F02D 41/405 (2013.01); F02M 26/14 (2016.02); F01N 2610/03 (2013.01); F01N 2610/146 (2013.01); F01N 2610/1453 (2013.01); Y02T 10/26 (2013.01); Y02T 10/44 (2013.01); Y02T 10/47 (2013.01)

(56) References Cited

U.S. PATENT DOCUMENTS

| | | | |
|---|---|---|---|
| 6,598,387 B2 | 7/2003 | Carberry et al. | |
| 6,622,480 B2 | 9/2003 | Tashiro et al. | |
| 7,104,048 B2 | 9/2006 | Brown | |
| 7,178,326 B2 | 2/2007 | Kojima et al. | |
| 7,716,920 B2 | 5/2010 | Onodera et al. | |
| 8,706,385 B2 * | 4/2014 | Nakayama | F02D 41/0072 123/568.11 |
| 2005/0217245 A1 | 10/2005 | Haseyama et al. | |
| 2005/0241299 A1 | 11/2005 | Brown | |
| 2009/0019836 A1 | 1/2009 | Nagaoka et al. | |
| 2010/0211293 A1 | 8/2010 | Yamada et al. | |
| 2011/0023839 A1 | 2/2011 | Styles et al. | |
| 2011/0139133 A1 | 6/2011 | Surnilla et al. | |
| 2011/0146244 A1 | 6/2011 | Farman et al. | |

FOREIGN PATENT DOCUMENTS

| | | |
|---|---|---|
| EP | 1584805 A2 | 10/2005 |
| GB | 2418377 A | 3/2006 |
| JP | 2002-364398 A | 12/2002 |
| JP | 2005-133596 A | 5/2005 |
| JP | 2008-196445 A | 8/2008 |
| JP | 2011-153537 A | 8/2011 |

OTHER PUBLICATIONS

United Kingdom Intellectual Property Office, Search Report in United Kingdom Patent Application No. GB1213462.3, Nov. 20, 2012, 1 p.

* cited by examiner

METHOD OF CONTROLLING OPERATION OF AN ENGINE HAVING BOTH AN EXHAUST FLUID RECIRCULATION APPARATUS AND AN EXHAUST FLUID TREATMENT APPARATUS

TECHNICAL FIELD

The disclosure relates to the field of engines having both an exhaust fluid recirculation apparatus and an exhaust fluid treatment apparatus.

BACKGROUND

In order to comply with regulatory requirements in relation to emissions from combustion engines, it is known to recirculate exhaust fluids in order to provide a further opportunity for combustion in the engine and also to provide exhaust fluid treatment apparatus to receive and treat exhaust fluid emitted by the combustion engine.

A combustion engine, such as a diesel engine, may involve injection of fuel, such as diesel fuel, into one or more cylinders of the engine for combustion. In addition to injection of fuel for combustion, fuel may be injected into one or more of the cylinders as a post combustion event with the intention that the fuel passes out of the one or more cylinders without oxidising. Such a technique may be useful when the combustion engine is used with an exhaust fluid treatment apparatus. This may allow for unburnt fuel to be delivered to the exhaust fluid treatment apparatus. Unburnt fuel may oxidise in the exhaust fluid treatment apparatus which may be useful when there is a desire to increase the temperature in the exhaust fluid treatment apparatus or when there is a desire to burn off, for example, unburnt carbon in the form of soot which may collect in a diesel particulate filter of the exhaust fluid treatment apparatus.

It may be desirable to control the engine in order to manage, in combination, both the supply of fuel intended not to combust in the cylinders and exhaust fluid recirculation. Such engine management may be intended to maximise any or all of engine efficiency, emission reduction and system reliability.

Against this background there is provided a method of controlling operation of an engine.

SUMMARY OF THE DISCLOSURE

A method of controlling operation of an engine, the engine comprising:
a combustion unit comprising one or more combustion cylinders, the combustion unit having an inlet and an outlet;
an exhaust fluid treatment apparatus configured to receive fluid from the outlet;
an exhaust fluid recirculation apparatus comprising a conduit for fluid communication between the combustion unit outlet and the combustion unit inlet and having a valve comprising a valve element movable between a fully open position and a fully closed position, wherein a position of the valve element between the fully open position and the fully closed position establishes an extent to which the valve is open, and wherein the fully closed position is configured to prevent fluid flowing in the conduit between the combustion unit outlet and the combustion unit inlet; and
an exhaust fluid recirculation controller configured to provide a primary signal for controlling the position of the valve element,
the method comprising:
confirming that the valve is in the fully closed position;
providing a secondary signal that the exhaust fluid recirculation valve should remain in the fully closed position, wherein the secondary signal overrides the primary signal; and
injecting fuel upstream of the valve for combustion in the exhaust fluid treatment apparatus.

DETAILED DESCRIPTION

Figure 1:
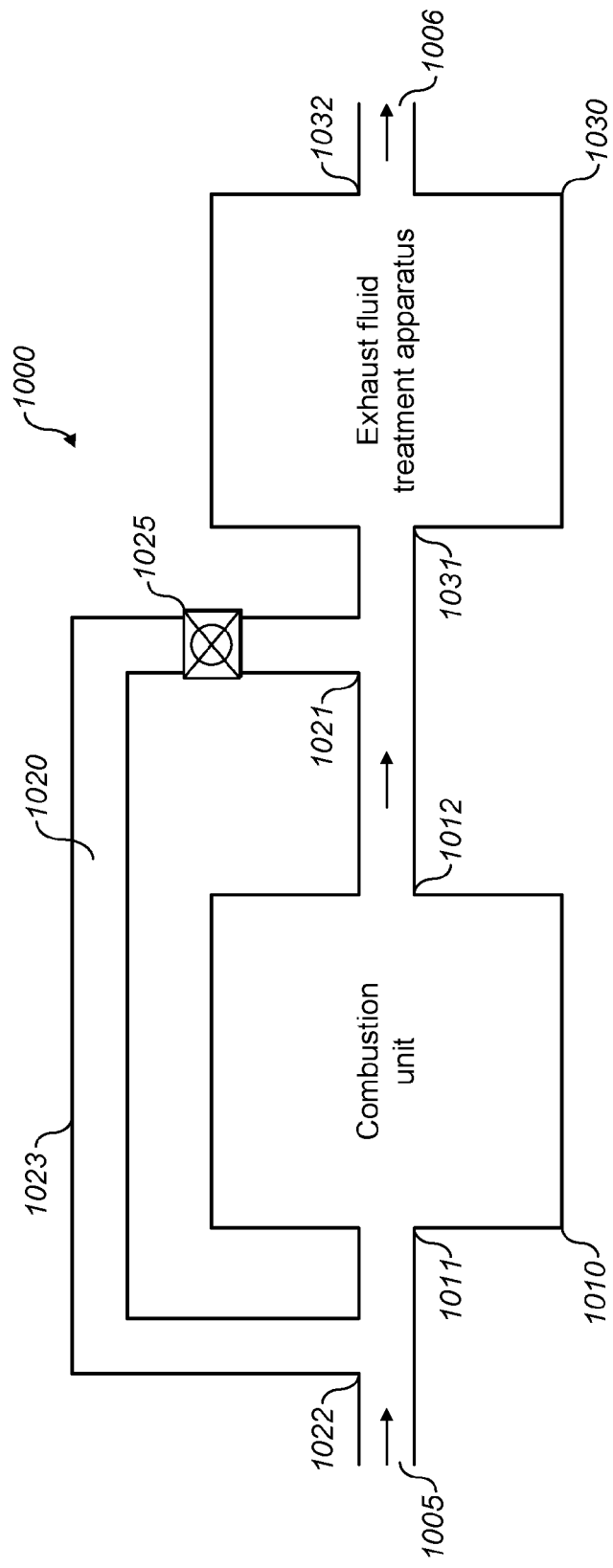
FIG. 1 shows schematic drawing of an engine comprising a combustion unit, an exhaust fluid recirculation apparatus and an exhaust fluid treatment apparatus to which the method of the present disclosure may be applied.

An engine to which the method of the present disclosure may be applied is shown in FIG. 1. The engine 1000 may comprise a combustion unit 1010, an exhaust fluid recirculation apparatus 1020 and an exhaust fluid treatment apparatus 1030.

The combustion unit 1010 may comprise an inlet 1011 for the receipt of fuel and oxidising gas (such as air) into the combustion unit, one or more combustion cylinders (not shown) for combustion of the fuel therein and an outlet 1012 through which products of the combustion (i.e. exhaust fluid) may flow.

The exhaust fluid treatment apparatus 1030 may comprise an inlet 1031 for receiving exhaust fluid and an outlet 1032 for emitting exhaust fluid, possibly to atmosphere or for further treatment. The exhaust fluid treatment apparatus 1030 may comprise a plurality of modules between the inlet 1031 and the outlet 1032, wherein each module is intended to treat one or more constituents of exhaust fluid. The modules may be arranged in series such that exhaust fluid flows through each module in sequence. Since the method of the present disclosure may be applicable to a wide range of exhaust fluid treatment apparatuses, a detailed description of a possible embodiment of an exhaust fluid treatment apparatus is discussed below after describing the method of the disclosure.

The exhaust fluid recirculation apparatus 1020 may comprise a conduit 1023 and a valve 1025 having a valve element movable between a fully open position and a fully closed position. A position of the valve element between the fully open position and the fully closed position may establish an extent to which the valve is open. The fully closed position may be configured to prevent fluid flowing in the conduit 1023.

The outlet 1012 of the combustion unit 1010 may be in fluid communication with the inlet 1021 of the exhaust fluid recirculation apparatus 1020 and the inlet 1031 of the exhaust fluid treatment apparatus 1030. The outlet 1022 of the exhaust fluid recirculation apparatus 1020 may be in fluid communication with the inlet 1011 of the combustion unit 1010. As such, exhaust fluid flowing through the outlet 1012 of the combustion unit 1010 may flow either into the inlet 1031 of the exhaust fluid treatment apparatus 1030 or into the inlet 1021 of the exhaust fluid recirculation apparatus 1020. If, however, the valve 1025 is fully closed, exhaust may be prevented from flowing through the conduit 1023 of the exhaust fluid recirculation apparatus to the outlet 1022 of the exhaust fluid recirculation apparatus 1020. As such, if the valve 1025 is fully closed, there may be no flow of fluid through the exhaust fluid recirculation apparatus 1020 back to the combustion unit 1010. If, on the other hand, the valve 1025 is in any position other than fully closed, there may be a flow of exhaust fluid into the exhaust fluid recirculation apparatus 1020 for recirculation back into the inlet 1011 of the combustion unit 1010.

Exhaust fluid emitted from the outlet 1012 of the combustion unit 1010 which may not flow through the exhaust fluid recirculation apparatus 1020 may flow into the exhaust fluid treatment apparatus 1030.

The extent to which the valve 1025 is open may control a proportion of the exhaust fluid emitted from the outlet 1012 of the combustion unit 1010 which travels through the conduit 1023 of the exhaust fluid recirculation apparatus 1020. That is to say, when the valve 1025 is open only fractionally, the proportion of the fluid flowing through the exhaust fluid recirculation apparatus 1020 may be small by comparison with the proportion of fluid flowing into the exhaust fluid treatment apparatus but when the valve 1025 is fully open, the proportion of the fluid flowing through the exhaust fluid recirculation apparatus 1020 may increase.

The pressure of the fluid in the apparatus 1000 may be controlled by a back pressure valve (not shown).

The method of the present disclosure may involve injecting a quantity of fuel upstream of the combustion unit 1010 for oxidation in the exhaust fluid treatment apparatus 1030.

There may be many possible reasons for requiring unburnt fuel to pass into the exhaust fluid treatment apparatus 1030. One possible reason might be to increase temperature of fluid at a certain position in the exhaust treatment apparatus 1030 by combustion either at or prior to that position. A further reason might be so as to combust the fuel in a region of the exhaust fluid treatment apparatus 1030 where particles, such as soot, collect in order to combust those particles. For example, this may constitute regeneration of a diesel particulate filter in the exhaust fluid treatment apparatus 1030 by combustion of soot trapped in the filter. By injecting fuel upstream of the combustion unit 1010 (such as into the combustion cylinders) this avoids a need for a separate fuel injector downstream of the combustion unit 1010 in addition to any injectors upstream of the combustion unit 1010.

It may be desirable to avoid unburnt fuel from entering the exhaust fluid recirculation apparatus 1020. This may be because having unburnt fuel in the exhaust fluid recirculation apparatus 1020 would result in a richer fuel to air ratio in the combustion unit 1010 since the fuel in the combustion unit 1010 would include fuel recirculated in the exhaust fluid recirculation apparatus 1020 which was injected for a different purpose of combustion in the exhaust fluid treatment apparatus 1030. A further reason for wishing to avoid unburnt fuel from entering the exhaust fluid recirculation apparatus 1020 may be to avoid that fuel from coating the interior of the conduit 1023 and thereby possibly causing unexpected behaviour.

It may also be desirable under certain conditions to have exhaust fluid re-enter the combustion unit 1010 by opening the valve 1025 so as to allow some of the exhaust fluid to pass from the combustion unit outlet 1012 along the conduit 1023 of the exhaust fluid recirculation apparatus 1020 to the inlet of the combustion unit 1010.

There may be many possible reasons for requiring exhaust fluid to re-enter the combustion unit 1010. For example, it may be desirable in order to increase temperature of fluid in the combustion unit 1010. Another reason may be to protect against overspeed of a turbo associated with the engine 1000 by diverting energy away from the turbo. A further reason may be to reduce generation of $NO_x$.

Figure 5:
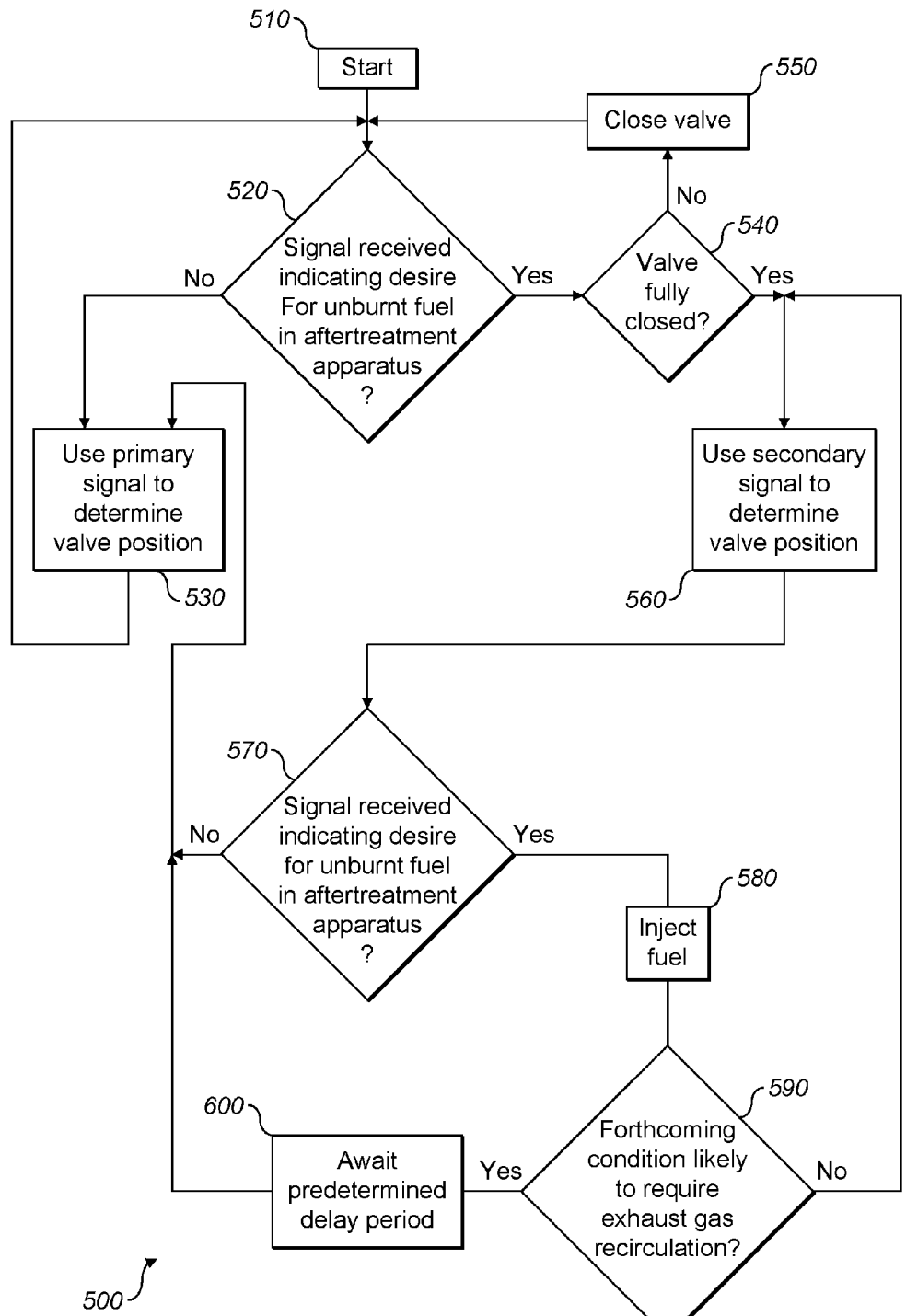
FIG. 5 shows a flow chart which illustrates an embodiment of the method of the disclosure.

The method of the present invention involves controlling, in a coordinated fashion, both (a) the injection of fuel upstream of the combustion unit 1010 for combustion in the exhaust fluid treatment apparatus 1030 (also known as HC dosing) and (b) the position of the exhaust fluid recirculation valve 1025. An embodiment of the method is illustrated in the form of a flow chart in FIG. 5.

A first high level control system may provide a primary signal to specify a desired position of the valve element 1025. A second high level control system may provide a signal indicating a desire for a quantity of fuel to be injected upstream of the combustion unit 1010 for combustion in the exhaust fluid treatment apparatus 1030 (see flow chart element 520). The signal indicating a desire for unburnt fuel to be injected for combustion in the exhaust fluid treatment apparatus 1030 may be influenced by a wide range of factors, including behaviour in the exhaust fluid treatment apparatus 1030, a requirement for servicing of the exhaust fluid treatment apparatus 1030, temperature and flow rate of exhaust fluid. If no unburnt fuel is required then the primary signal may simply be used to determine the valve position (see flow chart element 530).

If unburnt fuel is requested then, in order to achieve an objective of avoiding unburnt fuel travelling through the exhaust fluid recirculation apparatus 1020, the method may involve checking to confirm that the valve 1025 is fully closed (flow chart element 540).

The method may further comprise providing a secondary signal to override the primary signal (flowchart element 560), wherein the secondary signal specifies that the valve element 1025 must remain closed regardless of the primary signal.

In this way, the method may ensure that only once these conditions are met is a signal sent (flowchart element 580) to inject fuel upstream of the combustion unit 1010 for combustion in the exhaust fluid treatment apparatus 1030.

The secondary signal may effectively act as a "lock" which, when applied, prevents the valve element from moving away from the fully closed position.

The method may further comprise a procedure for ending the secondary signal overriding the primary signal. In particular, the method may involve detecting a forthcoming condition which necessitates the use of the exhaust fluid recirculation (flowchart element 590). Such a condition might include the expected future overspeed of a turbo associated with the engine. Overspeed of the turbo may be prevented by exhaust fluid recirculation. Use of exhaust fluid recirculation necessitates that the valve element is in a position other than the fully closed position. Once the condition is detected, the method may comprise stopping injection of fuel upstream of the combustion unit 1010 for combustion in the exhaust fluid treatment apparatus 1030. The method may require waiting a first predetermined period (flowchart element 600) which may be defined as a period of time predicted to be necessary in order that previously injected unburnt fuel is likely already to have passed into the exhaust fluid treatment apparatus 1030. Once the predetermined period has passed, the method may then comprise allowing the primary signal to override the secondary signal (flowchart element 530).

In this way, the "lock" feature may be effectively disabled which may allow for the valve element to move in response to other control requirements.

The first predetermined period may be related to the rate of flow of fluid in the combustion unit 1010. For this reason, a value indicative of the rate of flow of fluid in the combustion unit 1010 may be desirable. More specifically, the value may be indicative of the mass flow (kg/h) of fluid through the combustion unit 1010 or may be indicative of space velocity ($s^{-1}$) of fluid in the combustion unit 1010. This data value might be predicted based on measurements of fluid flow taken upstream or downstream of the combustion unit 1010, depending on location of appropriate sensors.

The flow rate data value indicative of the rate of flow of fluid in the combustion unit 1010 might be obtained using a model in combination with a mass fluid flow sensor located at a fluid (air) intake of the engine. The model may take into account the flow of fluid (air) into the engine, the volume of fuel injected into the engine, any potential exhaust fluid recirculation and any other relevant parameters in order to estimate the rate of flow of fluid.

Instead of or in addition to one or more mass fluid flow sensors, there may be provided a combination of temperature and pressure sensors from which rate of flow of fluid can be calculated, either in real time or by reference to a model, look-up table or similar. For example, by measuring temperature and pressure of fluid (air) intake and of exhaust fluid adjacent or within the combustion unit, mass fluid flow through the combustion unit may be estimated. Such an estimate may involve a model, look-up table or similar.

A mass flow value (kg/h) may be used, in combination with parameters relating to geometry of the flow path and other features of the apparatus, to estimate space velocity ($s^{-1}$) of fluid in the flow path.

An engine control unit may collect some or all of these data for the present purpose and/or for other purposes. Models and/or look up table for the present purpose and/or for other purposes may be present in the engine control unit.

Figure 2:
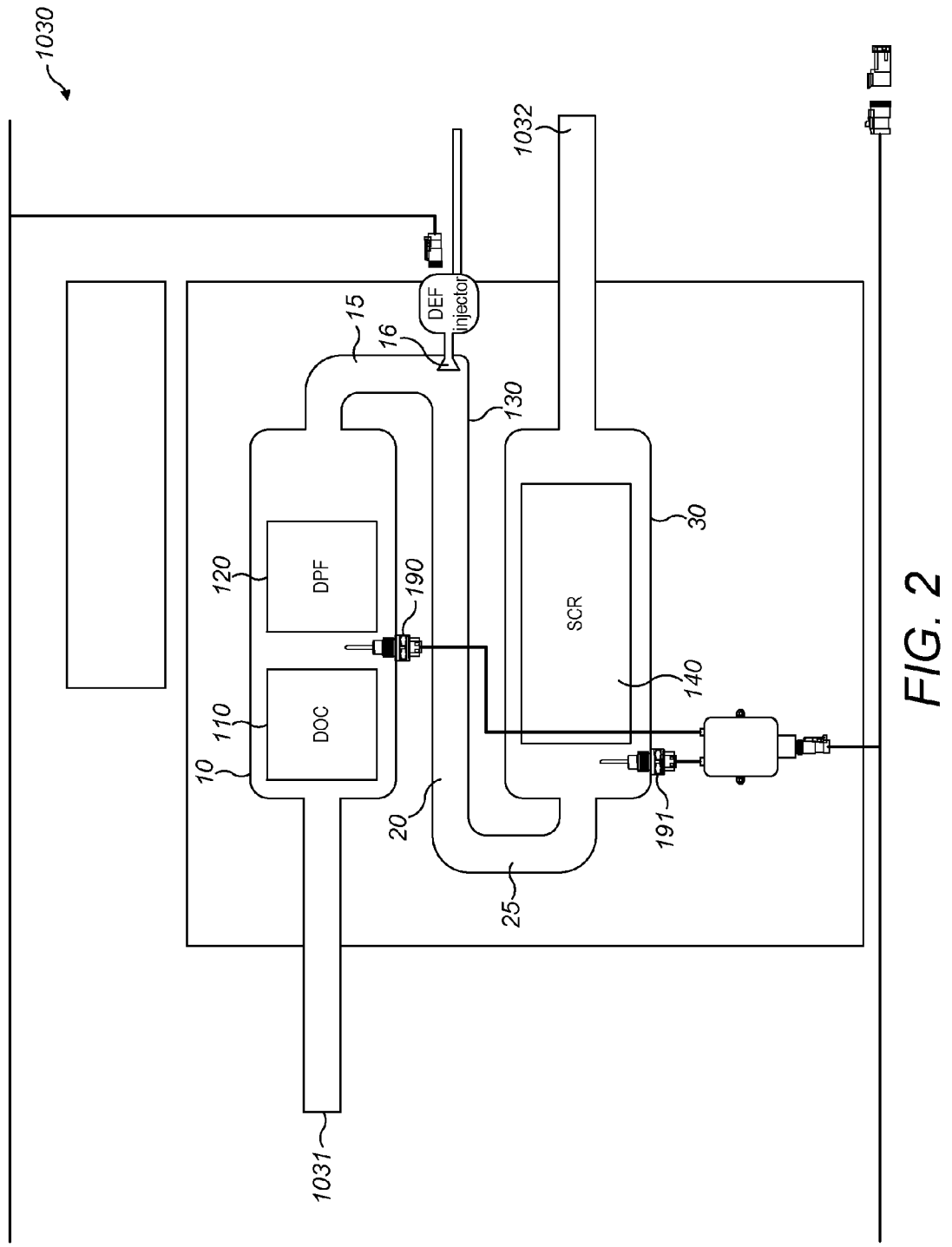
FIG. 2 shows a schematic drawing of the exhaust fluid treatment apparatus of FIG. 1.
Figure 3:
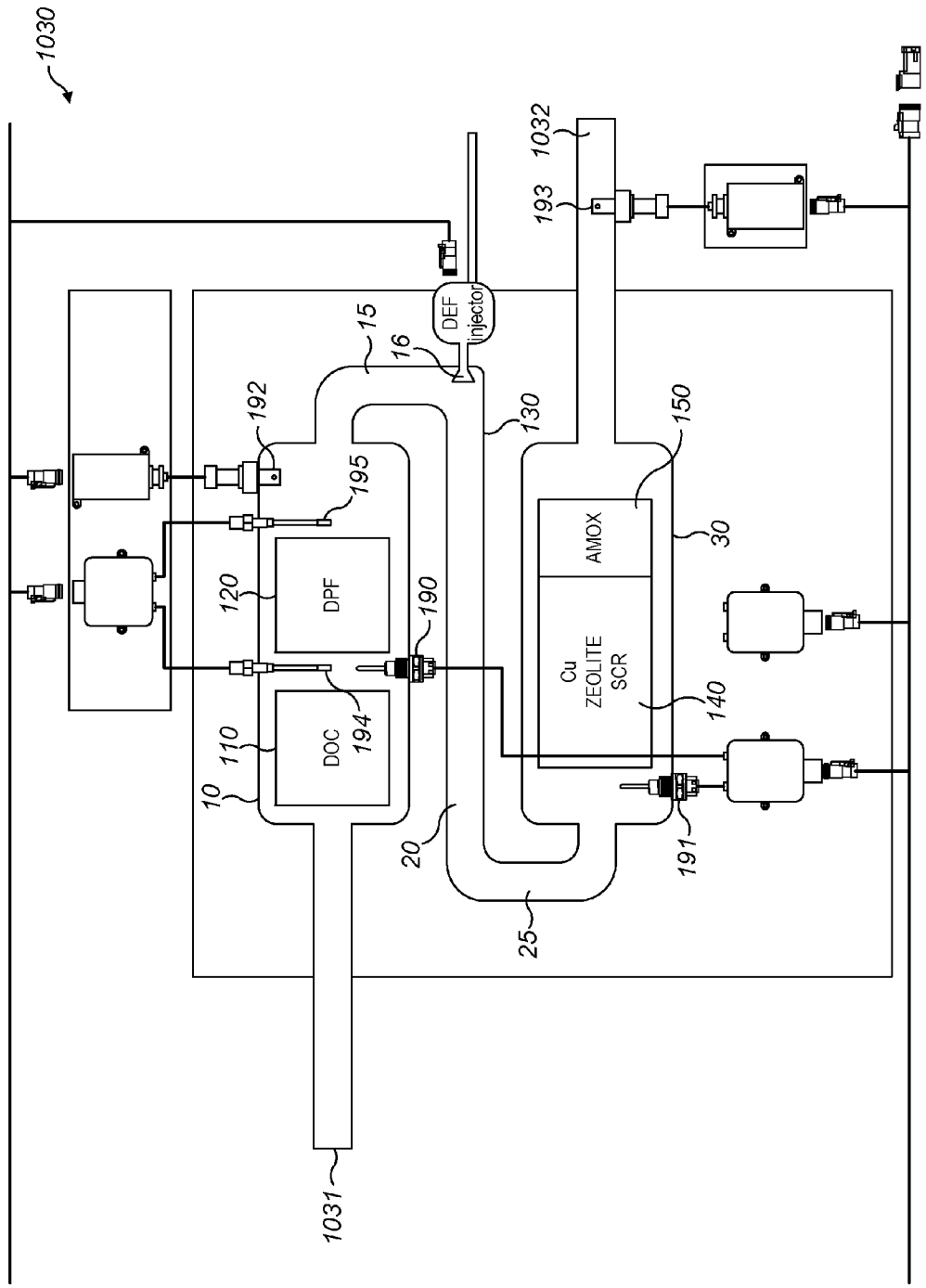
FIG. 3 shows a more detailed schematic drawing of the exhaust fluid treatment apparatus of FIG. 2.
Figure 4:
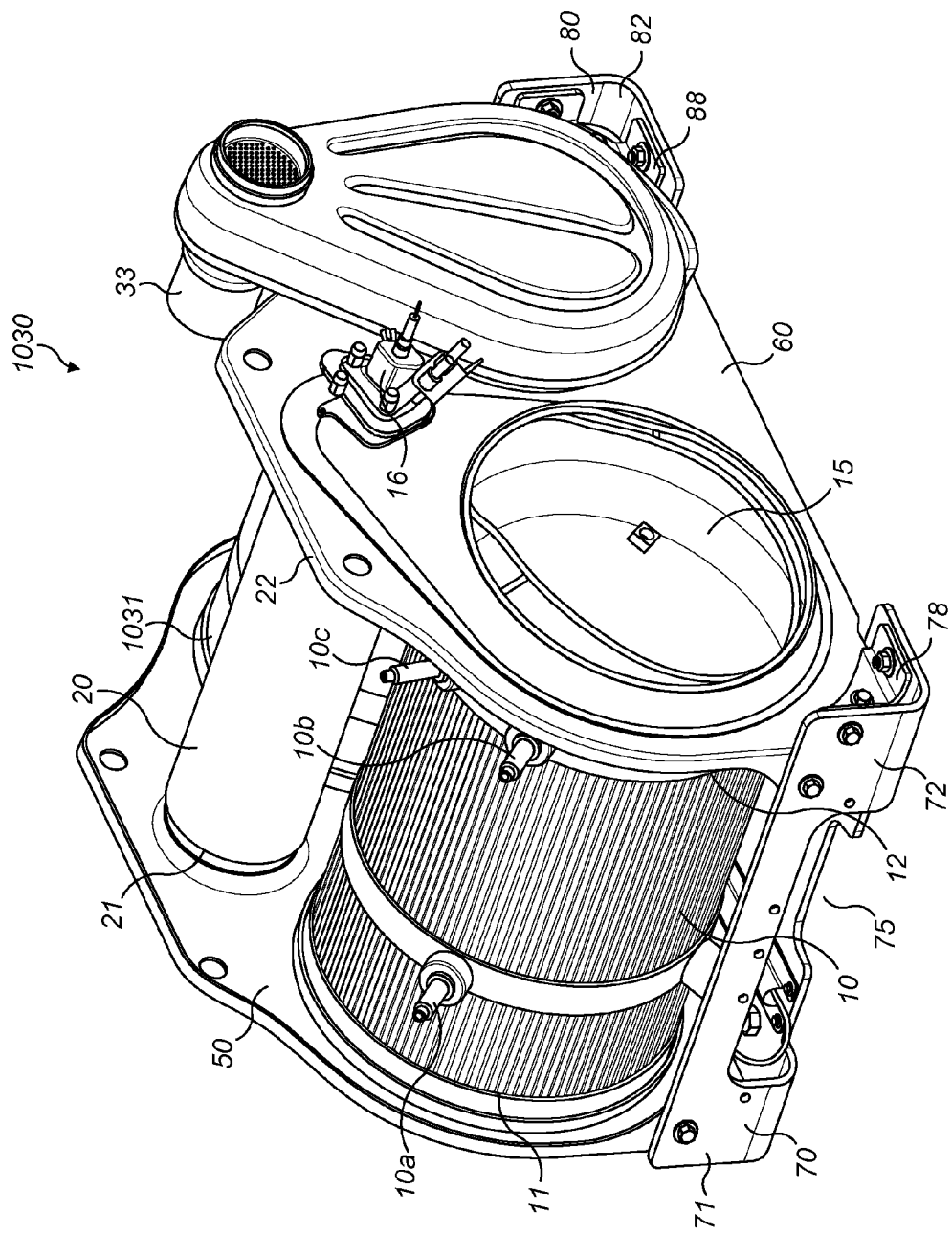
FIG. 4 shows a schematic drawing of an external appearance of the embodiment of FIG. 3.

The method of the disclosure may be applicable to a wide range of engines 1000 comprising an exhaust fluid recirculation apparatus 1020 and an exhaust fluid treatment apparatus 1030. FIGS. 2 to 4 show an example embodiment of an exhaust fluid treatment apparatus 1030 to which the method may be applied. Many of the features of this example embodiment are not necessary for the method of the present disclosure.

The exhaust fluid treatment apparatus 1030 of FIGS. 2 to 4 may comprise a conduit including fluid flow path through which fluid may flow sequentially through a first conduit 10, a first end coupling 15, a second conduit 20, a second end coupling 25, and a third conduit 30. The first, second and third conduits 10, 20, 30 may be substantially mutually parallel.

The fluid flow path may comprise, in series, a diesel oxidation catalyst (DOC) module 110, a diesel particulate filter (DPF) module 120, a mixer module 130, a selective catalytic reduction (SCR) module 140 and/or an ammonia oxidation catalyst (AMOX) module 150.

In use, fluid may be supplied to the exhaust fluid treatment apparatus 1030 via the inlet 1031. Fluid may pass into the DOC module 110 in the first portion of the first conduit 10.

The DOC module 110 may comprise one or more catalysts, such as palladium or platinum. These materials serve as catalysts to cause oxidation of hydrocarbons ([HC]) and carbon monoxide (CO) present in the fluid flow in order to produce carbon dioxide ($CO_2$) and water ($H_2O$). The catalysts may be distributed in a manner so as to maximise the surface area of catalyst material in order to increase effectiveness of the catalyst in catalysing reactions.

Fluid may flow from the DOC module 110 to the DPF module 120 which comprises features which are intended to prevent onward passage of carbon (C) in the form of soot. Carbon particles in the fluid may thus be trapped in the filter. The DPF module 120 may be regenerated through known regeneration techniques. These techniques may involve controlling one or more of the temperature of the fluid, the pressure of the fluid and the proportion of unburnt fuel in the fluid at this point in the apparatus.

Fluid may pass from the DPF module 120 to the first end coupling, so as to pass the injector module 16. The injector module 16 may be associated with or attachable to a pump electronic tank unit (PETU). The pump electronic tank unit may comprise a tank for providing a reservoir for fluid to be introduced to the exhaust fluid by the injector. Such fluids may include urea or ammonia.

The PETU may further comprise a controller configured to control a volume of fluid to be injected from the tank by the injector. The controller may have as inputs, for example, temperature information and quantity of $NO_x$ information which may be derived from sensors in the SCR module 140.

Emissions fluid may pass from the injector module 16 into the mixer module (not shown) located in the second conduit 20. The mixer module may comprise features for ensuring that the exhaust fluid originating from the first conduit 10 is well mixed with the emissions fluid originating from the injector 16, to create a mixed fluid.

The mixed fluid may pass from the second conduit 20 and into the SCR module located in the first portion of the third conduit via the second end coupling 25. The SCR module 140 may comprise one or more catalysts through which the mixed fluid may flow. As the mixed fluid passes over the surfaces of the catalyst a reaction may occur which converts the ammonia and $NO_x$ to diatomic nitrogen ($N_2$) and water ($H_2O$).

Fluid may pass from the SCR module 140 to the AMOX module 150 located in the second portion of the third conduit 30. The AMOX module 150 may comprise an oxidation catalyst which may cause residual ammonia present in the fluid exiting the SCR module to react to produce nitrogen ($N_2$) and water ($H_2O$).

Fluid may pass from the AMOX module 150 to the exhaust fluid treatment apparatus outlet located at the second end 32 of the third conduit 30.

As shown in FIG. 3, the exhaust fluid treatment apparatus 1030 may comprise sensors for detecting characteristics of the fluids at particular stages in their flow through the exhaust fluid treatment apparatus 1030. There may be a first temperature sensor (not shown) upstream of the DOC 110, a second temperature sensor 190 between the DOC 110 and the DPF 120 and/or a third temperature sensor 191 between the mixer module 130 and the SCR 140. There may be a first $NO_x$ sensor 192 between the DPF module 120 and the injector 16 and there may be a second $NO_x$ sensor 193 downstream of the AMOX module 150. There may also be a first soot sensor 194 immediately upstream of the DPF 120 and possibly a second soot sensor 195 immediately downstream of the DPF 120.

As stated above, there may be a variety of reasons why and circumstances in which it may be desirable to inject into engine cylinders fuel which is intended to pass through the cylinders unburnt. One further example may be a desire to achieve desulphation of an SCR module located downstream of the DOC as part of a SCR desulphation procedure. Such a desulphation procedure may require an increased temperature in the SCR in order that sulphur combusts. The increased temperature in the SCR may be achieved by injecting unburnt fuel into the DOC (upstream of the SCR) for burning in the DOC and thereby increasing a temperature of the fluid arriving at the SCR. Such a procedure may take place intermittently and might occur only when a need for such a procedure has been identified as part of overall engine control. The method of the present invention may be used as part of this procedure.

The terms exhaust gas and exhaust fluid may be used interchangeably. The exhaust gas/fluid may include solid particles such as particles of soot which, while in the solid phase, may be understood to be a constituent of exhaust gas/fluid.

The invention claimed is:

1. A method of controlling operation of an engine, the engine comprising:
   a combustion unit comprising at least one combustion cylinder, the combustion unit having an inlet and an outlet;
   an exhaust fluid treatment apparatus configured to receive fluid from the outlet;
   an exhaust fluid recirculation apparatus comprising a conduit for fluid communication between the combustion unit outlet and the combustion unit inlet and having a valve movable between open and closed positions, wherein the closed position is configured to prevent fluid flowing in the conduit between the combustion unit outlet and the combustion unit inlet; and
   an exhaust fluid recirculation controller configured to provide a primary signal for controlling the position of the valve,
   the method comprising:
      confirming that the valve is in the closed position;
      providing a secondary signal that the exhaust fluid recirculation valve should remain in the fully closed position, wherein the secondary signal overrides the primary signal;
      injecting fuel upstream of the valve for combustion in the exhaust fluid treatment apparatus;
      detecting when the primary signal indicates a desired position of the valve which is other than the fully closed position;
      stopping the step of injecting fuel;
      waiting a first predetermined period; and
      allowing the primary signal to override the secondary signal.

2. The method of claim 1 wherein the step of injecting fuel upstream of the valve for combustion in the exhaust fluid treatment apparatus comprises injecting fuel downstream of the combustion unit.

3. The method of claim 1 wherein the first predetermined period is a fixed time.

4. The method of claim 1 wherein the first predetermined period is dependent on measured or predicted mass flow of fluid through the combustion unit.

5. The method of claim 1 wherein the first predetermined period is dependent on a volume of injected fuel injected in a preceding number of injections.

6. The method of claim 1 wherein the step of injecting fuel upstream of the valve for combustion in the exhaust fluid treatment apparatus comprises injecting fuel into at least one of the at least one combustion cylinder.

7. The method of claim 6 wherein the step of injecting fuel upstream of the valve for combustion in the exhaust fluid treatment apparatus occurs when an exhaust valve of the at least one combustion cylinder is open.

8. A method of controlling operation of an engine, the engine comprising:
   a combustion unit comprising at least one combustion cylinder, the combustion unit having an inlet and an outlet;
   an exhaust fluid treatment apparatus configured to receive fluid from the outlet;
   an exhaust fluid recirculation apparatus comprising a conduit for fluid communication between the combustion unit outlet and the combustion unit inlet and having a valve movable between open and closed positions, wherein the closed position is configured to prevent fluid flowing in the conduit between the combustion unit outlet and the combustion unit inlet; and
   an exhaust fluid recirculation controller configured to provide a primary signal for controlling the position of the valve,
   the method comprising:
      confirming that the valve is in the closed position;
      providing a secondary signal that the exhaust fluid recirculation valve should remain in the fully closed position, wherein the secondary signal overrides the primary signal;
      injecting fuel upstream of the valve for combustion in the exhaust fluid treatment apparatus;
      detecting when the primary signal indicates a desired position of the valve which is other than the fully closed position;
      stopping the step of injecting fuel;
      awaiting a first predetermined period;
      checking whether it is true or false that the primary signal continues to indicate a desired position of the valve which is other than the fully closed position; and,
      when it is true: enabling the primary signal to override the secondary signal;
      when it is false: enabling the secondary signal to override the primary signal.

9. The method of claim 8 wherein the first predetermined period is a fixed time.

10. The method of claim 8 wherein the first predetermined period is dependent on measured or predicted mass flow of fluid through the combustion unit.

11. The method of claim 8 wherein the first predetermined period is dependent on a volume of injected fuel injected in a preceding number of injections.

12. The method of claim 8 wherein the step of injecting fuel upstream of the valve for combustion in the exhaust fluid treatment apparatus comprises injecting fuel into at least one of the at least one combustion cylinder.

13. A method of controlling operation of an engine, the engine comprising:
   a combustion unit comprising at least one combustion cylinder, the combustion unit having an inlet and an outlet;
   an exhaust fluid treatment apparatus configured to receive fluid from the outlet;
   an exhaust fluid recirculation apparatus comprising a conduit for fluid communication between the combustion unit outlet and the combustion unit inlet and having a valve movable between open and closed positions, wherein the closed position is configured to prevent fluid flowing in the conduit between the combustion unit outlet and the combustion unit inlet; and an exhaust fluid recirculation controller configured to provide a primary signal for controlling the position of the valve, the method comprising:
confirming that the valve is in the closed position;
providing a secondary signal that the exhaust fluid recirculation valve should remain in the fully closed position, wherein the secondary signal overrides the primary signal;
injecting fuel upstream of the valve for combustion in the exhaust fluid treatment apparatus;
receiving a tertiary signal indicative of a requirement for exhaust fluid recirculation;
stopping injecting fuel upstream of the valve for combustion in the exhaust fluid treatment apparatus;
awaiting a second predetermined period; and
enabling the primary signal to override the secondary signal.

14. The method of claim 13 wherein the tertiary signal is caused by a turbocharger associated with the engine increasing in speed above a threshold.

15. The method of claim 13 wherein the second predetermined period is dependent on a prediction of a period taken for the injected fuel to have passed into the exhaust fluid treatment apparatus.

* * * * *

UNITED STATES PATENT AND TRADEMARK OFFICE
CERTIFICATE OF CORRECTION

PATENT NO. : 9,488,089 B2  
APPLICATION NO. : 14/416239  
DATED : November 8, 2016  
INVENTOR(S) : Antony Eager Page 1 of 1

It is certified that error appears in the above-identified patent and that said Letters Patent is hereby corrected as shown below:

In the Specification

Column 1, Line 6, below 'Title' insert -- CROSS-REFERENCE TO RELATED APPLICATION This application is a U.S. National Phase of International Patent Application No. PCT/GB2013/051978, filed on July 24, 2013, which claims priority benefit of British Patent Application No. 1213462.3, filed on July 27, 2012. Each of the above-referenced applications is hereby incorporated herein by reference in its entirety. --.

Signed and Sealed this  
Twenty-eighth Day of March, 2017

Michelle K. Lee  
*Director of the United States Patent and Trademark Office*